United States Patent
Lee et al.

(10) Patent No.: US 12,422,226 B2
(45) Date of Patent: Sep. 23, 2025

(54) BALLISTIC RESISTANT PANEL EDGE ENHANCED INTEGRITY

(71) Applicant: Central Lake Armor Express, Inc., Arlington, VA (US)

(72) Inventors: Robert Lee, Jermyn, PA (US); Travis Paul Holt, Rapid City, MI (US); James Alan O'Neal, Bellaire, MI (US)

(73) Assignee: Central Lake Armor Express, Inc., Eden, NC (US)

( * ) Notice: Subject to any disclaimer, the term of this patent is extended or adjusted under 35 U.S.C. 154(b) by 8 days.

(21) Appl. No.: 18/513,798

(22) Filed: Nov. 20, 2023

(65) Prior Publication Data

US 2025/0164216 A1    May 22, 2025

(51) Int. Cl.
*F41H 5/04* (2006.01)
*B32B 5/02* (2006.01)
(Continued)

(52) U.S. Cl.
CPC .......... *F41H 5/0471* (2013.01); *B32B 5/024* (2013.01); *B32B 5/073* (2021.05); *B32B 5/12* (2013.01); *B32B 38/08* (2013.01); *B32B 2038/008* (2013.01); *B32B 2260/023* (2013.01); *B32B 2260/046* (2013.01); *B32B 2262/0253* (2013.01); *B32B 2262/0269* (2013.01); *B32B 2305/076* (2013.01); *B32B 2305/188* (2013.01); *B32B 2323/04* (2013.01); *B32B 2377/00* (2013.01); *B32B 2571/02* (2013.01); *B32B 2607/00* (2013.01)

(58) Field of Classification Search
CPC ......... F41H 5/047; B32B 5/073; B32B 5/024; B32B 5/12; B32B 38/08; B32B 2038/008; B32B 2260/023; B32B 2305/076; B32B 2305/188; B32B 2323/04; B32B 2377/00; B32B 2571/02; B32B 2607/00; B32B 2260/046
USPC ........................................................ 89/36.02
See application file for complete search history.

(56) References Cited

U.S. PATENT DOCUMENTS 2,756,429 A    7/1956    Malachowski
3,093,829 A    6/1963    De Witt
(Continued)

FOREIGN PATENT DOCUMENTS

CN         116653387 A      8/2023
KR         20180032405 A    3/2018
WO    WO-2024023678 A1 *   2/2024

*Primary Examiner* — Samir Abdosh
(74) *Attorney, Agent, or Firm* — Inovue Advisors, LLC

(57) ABSTRACT

A ballistic resistant panel assembly includes a plurality of ballistic resistant plies positioned in a stack. A binding layer which includes a first portion which extends along and overlies a first ply of the stack; a second portion extends from the first portion and extends along peripheral edges of the plurality of the ballistic resistant plies; and a third portion extends from the second portion and extends along a last ballistic resistant ply such that the last ply is positioned between the first ply and the third portion. A plurality of stitches extend through the first and third portions of the binding layer and through first and last plies of the stack, such that the plurality of stitches form a configuration which includes rows of stitches which extend spaced apart from one another and extend spaced apart from a peripheral stack edge of the plurality of ballistic resistant plies.

24 Claims, 10 Drawing Sheets

(51) Int. Cl.
  *B32B 5/06* (2006.01)
  *B32B 5/12* (2006.01)
  *B32B 38/08* (2006.01)
  *B32B 38/00* (2006.01)

(56) References Cited

U.S. PATENT DOCUMENTS

| | | | |
|---|---|---|---|
| 3,924,038 A * | 12/1975 | McArdle | B32B 3/04 |
| | | | 428/116 |
| 4,924,103 A | 5/1990 | Stein et al. | |
| 5,557,802 A | 9/1996 | Wickert | |
| 5,960,470 A | 10/1999 | Bachner, Jr. | |
| 6,131,193 A | 10/2000 | Bachner, Jr. | |
| 6,219,842 B1 | 4/2001 | Bachner, Jr. | |
| 6,704,934 B2 | 3/2004 | Graham et al. | |
| 7,251,835 B2 | 8/2007 | Learmont | |
| 8,596,182 B2 | 12/2013 | Mann et al. | |
| 9,435,614 B2 | 9/2016 | Beck | |
| 9,578,910 B2 | 2/2017 | Strauß | |
| 9,851,181 B2 | 12/2017 | Beck | |
| 10,267,601 B1 | 4/2019 | Beck | |
| 10,317,175 B2 | 6/2019 | Cejas | |
| 10,591,256 B2 | 3/2020 | Beck | |
| 10,667,568 B2 | 6/2020 | Rosati et al. | |
| 10,788,293 B2 | 9/2020 | Beck | |
| 10,788,294 B2 | 9/2020 | Goodson et al. | |
| 10,921,094 B2 | 2/2021 | Beck | |
| 11,174,818 B2 * | 11/2021 | Norman | F02K 9/97 |
| 11,448,485 B2 | 9/2022 | Beck | |
| 11,650,025 B2 | 5/2023 | Beck | |
| 11,713,945 B2 | 8/2023 | Beck | |
| 11,965,718 B2 | 4/2024 | Contri | |
| 11,994,368 B2 * | 5/2024 | Beck | F41H 5/013 |
| 12,000,677 B2 * | 6/2024 | Baggen | F41H 5/0485 |
| 2011/0061522 A1 | 3/2011 | Jarrett | |
| 2012/0180177 A1 | 7/2012 | Learmont | |
| 2013/0276623 A1 | 10/2013 | Moore et al. | |
| 2015/0096479 A1 * | 4/2015 | McCarthy | A47F 9/00 |
| | | | 89/36.02 |
| 2017/0241748 A1 * | 8/2017 | Cejas | B32B 5/022 |
| 2019/0390941 A1 | 12/2019 | Beck | |
| 2021/0231409 A1 | 7/2021 | Beck | |
| 2021/0310770 A1 | 10/2021 | Beck | |
| 2022/0099047 A1 * | 3/2022 | Norman | B64G 1/58 |
| 2023/0015396 A1 | 1/2023 | Maurer et al. | |
| 2024/0167792 A1 | 5/2024 | Beck | |

* cited by examiner

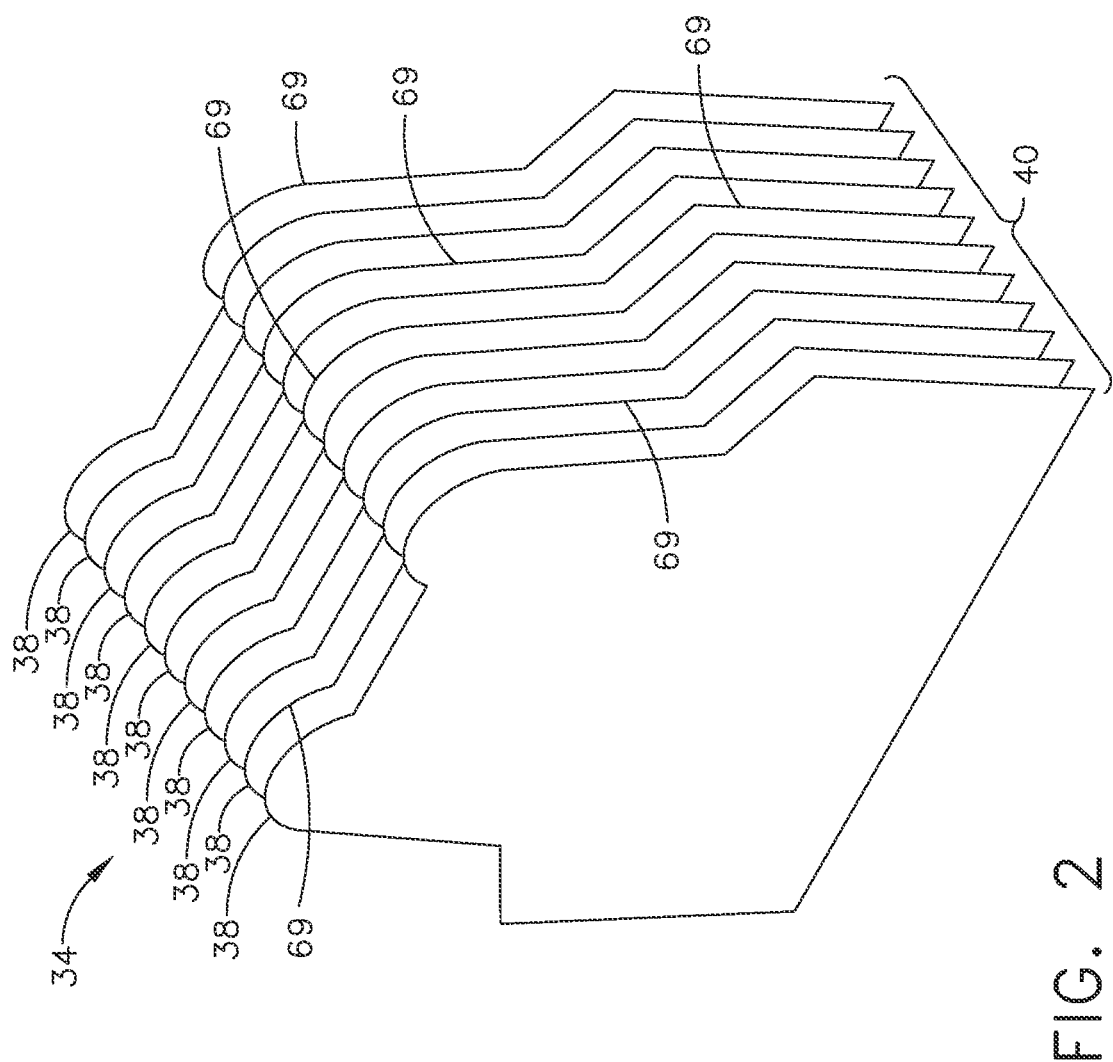

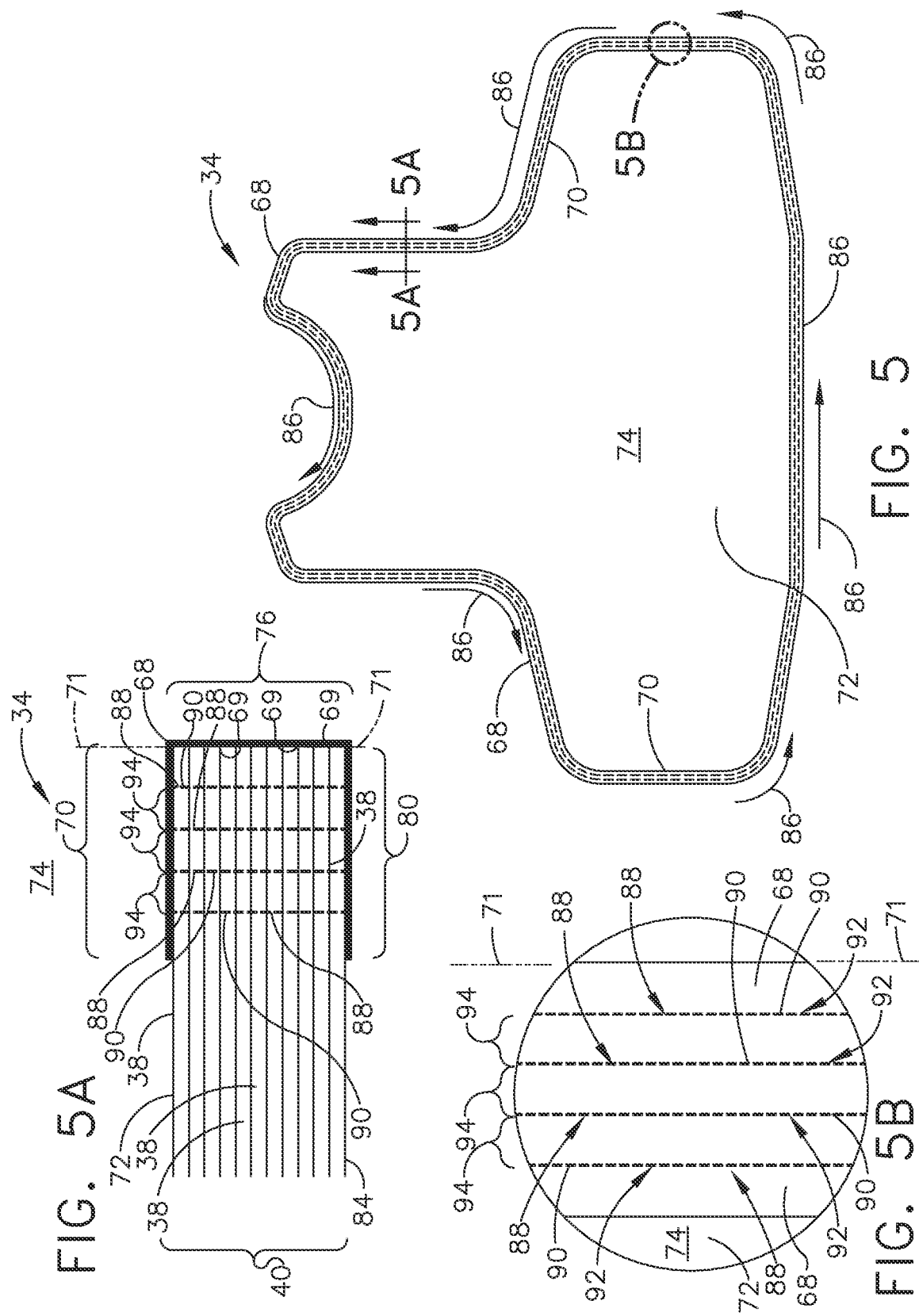

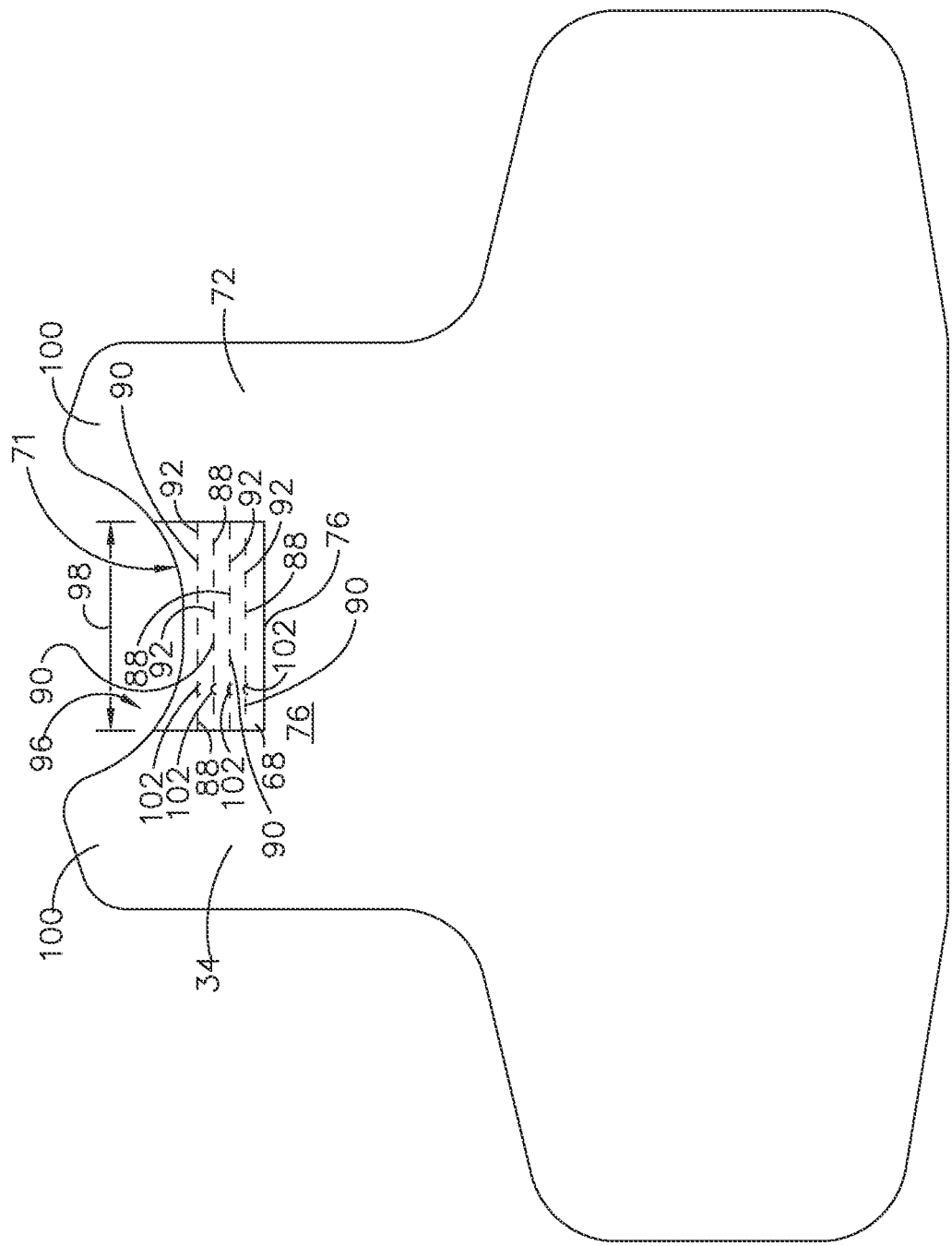

BALLISTIC RESISTANT PANEL EDGE ENHANCED INTEGRITY

FIELD

This disclosure relates to ballistic resistant panel assemblies, and more particularly ballistic resistant panel assemblies wherein the ballistic resistant panel assemblies include plies of ballistic resistant material.

BACKGROUND

Ballistic resistant panel assemblies have many applications of use for providing ballistic protection. One application of use for the ballistic resistant panel assembly is positioning them within a ballistic resistant protective garment assembly to provide life-saving ballistic protection to a wearer. Ballistic resistant panel assemblies are strategically positioned within the ballistic resistant protective garment assembly to optimize protection to the wearer. Ballistic resistant protective garment assemblies that are worn under clothing of the wearer are referred to as concealable ballistic resistant protective garments and those worn outside of the clothing of the wearer are often referred to as a tactical ballistic resistant protective garment. Other applications of use for ballistic resistant panel assemblies include use with respect to hand-held shields, vehicles, personnel enclosures and other application of uses where protection from ballistic projectiles is needed.

Ballistic resistant panel assemblies can be constructed from a wide variety of ballistic resistant materials. A ballistic resistant panel assembly can, for example, have a plurality of plies. These plies can be constructed of ballistic resistant fibers configured in a woven fabric. The fibers can be selected from a wide variety of high strength ballistic resistant fibers having a composition such as an aramid, an ultra-high molecular weight polyethylene (UHMWPE) or other like high strength fibers utilized for ballistic protection. The plies are woven in a select weave pattern such as utilizing a plain weave, sateen weave or other common weave pattern employed for woven plies used for constructing a ballistic resistant panel assembly. Other ply constructions, for example, have a composite laminate unidirectional fiber construction which utilizes fibers composed of an aramid, (UHMWPE) fibers or other high strength fibers, which are positioned in layers within the ply such that each layer has unidirectional orientation of the high strength ballistic resistant fibers. The layers are laminated together with a material such as for example a polyethylene resin. Yet other examples of utilizing ballistic resistant material can include having a hard plate construction made from one or more of a metal, ceramic, and/or aramid materials which are positioned within the ballistic resistant protective garment. Construction of a ballistic resistant panel assembly includes utilizing one or more of these various materials and constructions depending on the performance that is needed.

Ballistic resistant panel assemblies such as used in a protective body armor garment assembly or in other applications of use of ballistic resistant panels, utilize a plurality of plies. The plies are constructed of a plurality of woven fibers or of composite unidirectional fiber laminates. Upon impact of a ballistic projectile onto a ballistic resistant panel assembly proximate to a peripheral edge portion of the ballistic resistant panel, such impact, whether in a direction generally perpendicular to the ballistic resistant panel assembly or in an angular direction relative to the ballistic resistant panel assembly, can promote separation of the plies within the ballistic resistant panel assembly, a phenomenon not likely to occur in an impact location in a more central location of the ballistic resistant panel assembly.

With the ballistic projectile being slowed down by the ballistic resistant plies, the process of stopping the ballistic resistant projectile can promote separation of the ballistic resistant plies positioned near the impact location proximate the peripheral edge of the ballistic resistant panel assembly. Separation of the ballistic resistant plies provides less resistance to the ballistic projectile which may have a component of movement toward the peripheral edge of the ballistic resistant panel assembly.

There is a need to provide enhanced integrity to a ballistic resistant panel assembly in the peripheral edge portion so as to reduce and/or prevent ply separation within the ballistic resistant panel assembly and facilitate capture of the ballistic projectile thereby optimizing the ballistic resistant panel performance.

SUMMARY

A ballistic resistant panel assembly including a plurality of ballistic resistant plies positioned in a stack. The assembly includes a binding layer, wherein: a first portion of the binding layer extends along and overlies a first ballistic resistant ply of the stack; a second portion of the binding layer extends from the first portion of the binding layer and extends along peripheral edges of the plurality of the ballistic resistant plies in the stack; and a third portion of the binding layer extends from the second portion of the binding layer and extends along a last ballistic resistant ply of the stack such that the last ballistic ply is positioned between the first ballistic resistant ply and the third portion of the binding layer. The assembly further includes a plurality of stitches extend through the first portion and the third portion of the binding layer and through the first and last ballistic resistant plies, such that the plurality of stitches form a configuration which comprises rows of stitches which extend spaced apart from one another and spaced apart from a peripheral stack edge of the plurality of ballistic resistant plies.

A method for fabricating a ballistic resistant panel assembly, which includes positioning a plurality of ballistic resistant plies into a stack. The method includes placing a binding layer, wherein: a first portion of the binding layer extends along and overlies a first ballistic ply of the plurality of ballistic resistant plies; a second portion of the binding layer extends from the first portion of the binding layer and extends along peripheral edges of the plurality of the ballistic resistant plies in the stack; and a third portion of the binding layer extends from the second portion of the binding layer and extends along a last ballistic resistant ply of the stack such that the last ballistic ply is positioned between the first ballistic resistant ply and the third portion of the binding layer. The method further includes placing a plurality of stitches through the first portion and the third portion of the binding layer and through the first and last ballistic resistant plies, such that the plurality of stitches form a configuration which comprise rows of stitches which extend spaced apart from one another and spaced apart from a peripheral stack edge of the plurality of ballistic resistant plies.

A ballistic resistant panel assembly including a plurality of ballistic resistant plies positioned in a stack. The ballistic resistant panel assembly further includes a binding layer, wherein: a first portion of the binding layer extends along and overlying a first ballistic resistant ply of the stack; a second portion of the binding layer extends from the first portion of the binding layer and extends along peripheral edges of the ballistic resistant plies in the stack; and a third portion of the binding layer extends from the second portion of the binding layer and extends along a last ballistic resistant ply of the stack, such that the last ballistic resistant ply is positioned between the first ballistic resistant ply and the third portion of the binding layer. The ballistic resistant panel assembly further includes a securement mechanism which binds together the first portion of the binding layer to the first ballistic resistant ply and the third portion of the binding layer to the last ballistic resistant ply, wherein the securement mechanism comprises one of: an adhesive layer positioned between the first portion of the binding layer and the first ballistic resistant ply and positioned between the third portion of the binding layer and the last ballistic resistant ply wherein the adhesive layer is further positioned between adjacent ballistic resistant plies positioned between the first ballistic resistant ply and the last ballistic resistant ply; or a compression heated molded layer positioned between the first portion of the binding layer and the first ballistic resistant ply and positioned between the third portion of the binding layer and the last ballistic resistant ply wherein the compression heated molded layer is further positioned between adjacent ballistic resistant plies positioned between the first ballistic resistant ply and the last ballistic resistant ply; or a plurality of rivets which extend through the first portion of the binding layer, the first ballistic resistant ply, the last ballistic resistant ply and the third portion of the binding layer.

A method for fabricating a ballistic resistant panel assembly, which includes the steps of: positioning a plurality of ballistic resistant plies into a stack. The method further includes placing a binding layer, wherein: a first portion of the binding layer extends along and overlies a first ballistic resistant ply, of the plurality of ballistic resistant plies; a second portion of the binding layer extends from the first portion of the binding layer and extends along peripheral edges of the ballistic resistant plies in the stack; and a third portion of the binding layer extends from the second portion of the binding layer and extends along a last ballistic resistant ply of the stack, such that the last ballistic resistant ply is positioned between the first ballistic resistant ply and the third portion of the binding layer. The method further includes placing a securement mechanism which binds together the first portion of the binding layer to the first ballistic resistant ply and which binds the third portion of the binding layer to the last ballistic resistant ply, wherein the securement mechanism includes one of: an adhesive layer positioned between the first portion of the binding layer and the first ballistic resistant ply and positioned between the third portion of the binding layer and the last ballistic resistant ply wherein the adhesive layer is further positioned between adjacent ballistic resistant plies positioned between the first ballistic resistant ply and the last ballistic resistant ply; or a compression heated molded layer positioned between the first portion of the binding layer and the first ballistic resistant ply and positioned between the third portion of the binding layer and the last ballistic resistant ply wherein the compression heated molded layer is further positioned between adjacent ballistic resistant plies positioned between the first ballistic resistant ply and the last ballistic resistant ply; or a plurality of rivets which extend through the first portion of the binding layer, the first ballistic resistant ply, the last ballistic resistant ply and the third portion of the binding layer.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 2 is a schematic perspective exploded view of a plurality of ballistic resistant plies which form a front ballistic resistant panel assembly of the concealable ballistic resistant panel carrier assembly as seen in FIG. 1;

FIG. 5 is a plan schematic view of a first example of the plurality of ballistic resistant plies assembled of FIG. 2 with the perimeter edge of the ballistic resistant panel encased;

FIG. 5A is a cross section view along line 5A-5A of FIG. 5;

FIG. 5B is an enlarged view of that which is encircled and identified as FIG. 5B, in FIG. 5;

FIG. 6 is a plan view of a second example of the plurality of ballistic resistant plies assembled of FIG. 2 with a portion of the perimeter edge in the neck region of the ballistic resistant panel encased;

FIG. 9A is a schematic cross section view along line 9A-9A of FIG. 9 which schematically represents the first version and schematically represents the second version of the third example of FIG. 9;

FIG. 10A is a schematic cross section view along line 10A-10A of FIG. 10.

DESCRIPTION

As will be appreciated in the discussion herein, it is important to provide enhanced integrity to a ballistic resistant panel assembly proximate to a peripheral edge of the ballistic resistant panel assembly. Upon impact of a ballistic projectile proximate to the peripheral edge of the ballistic resistant panel assembly the enhanced integrity is needed to resist separation of the ballistic resistant plies proximate to the peripheral edge of the ballistic resistant panel assembly and to facilitate capture of the ballistic projectile. An example of a ballistic resistant panel assembly that will be discussed herein as an example in which enhanced integrity is provided will be a front ballistic resistant panel assembly that is used with a ballistic resistant garment. The enhanced integrity discussed herein can be similarly applied to a back ballistic resistant panel assembly of a ballistic resistant garment or to other applicational uses of ballistic resistant panels, as mentioned earlier, such as used in association with hand-held shields, backpacks, extremity protection devices, vehicles, personnel enclosures and other applicational uses where ballistic projectile protection is needed.

Figure 1:
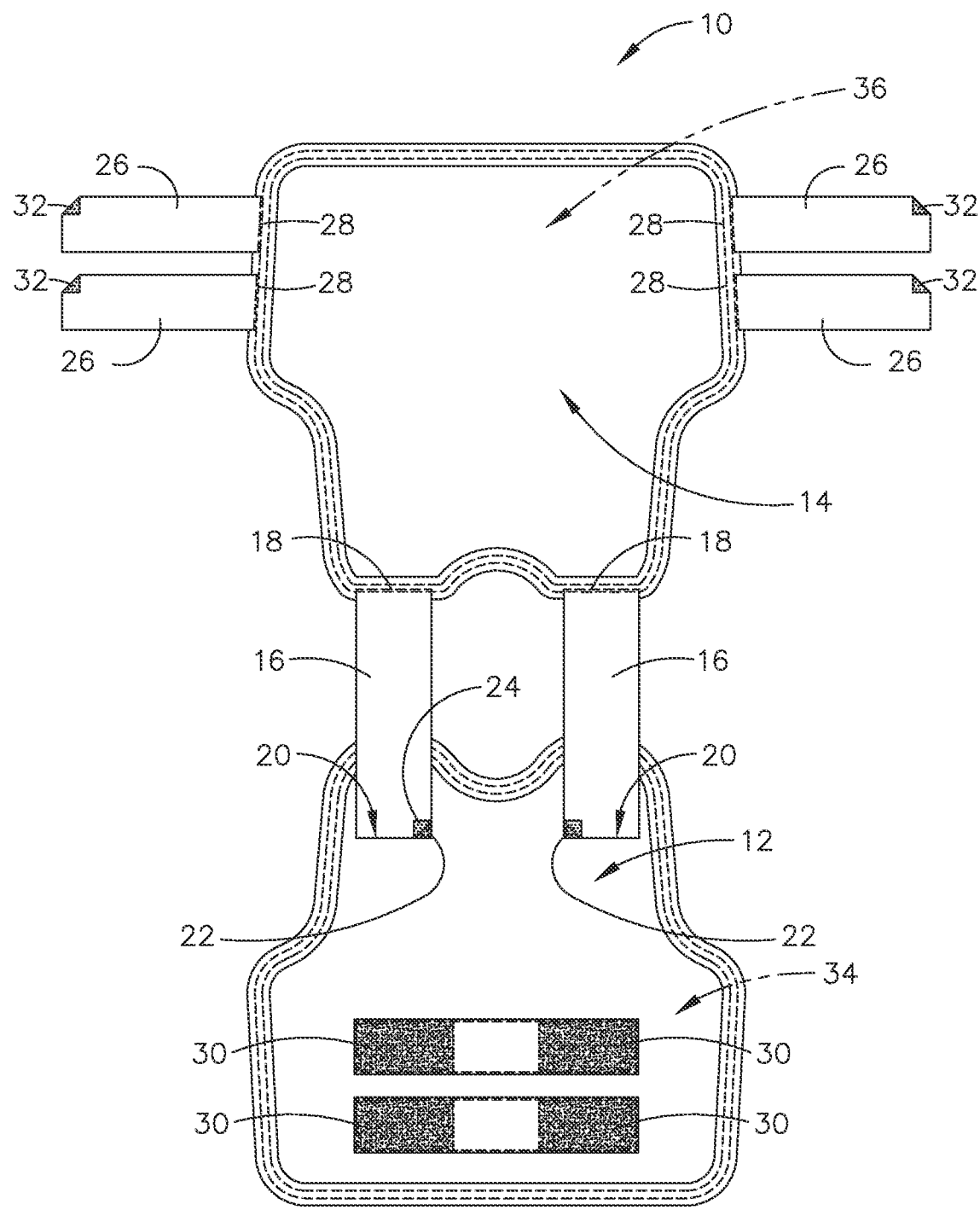
FIG. 1 is a plan view of an example of a concealable ballistic resistant panel carrier assembly.

The enhanced integrity of a ballistic resistant panel to be discussed herein will provide ballistic resistant plies of the ballistic resistant panel assembly to resist separation of ballistic resistant plies at a location proximate to the peripheral edge of a ballistic resistant panel assembly where impact of a ballistic resistant projectile has occurred and to facilitate capture of the ballistic projectile. Separation of ballistic resistant plies can occur with the ballistic projectile traveling either directly at the ballistic resistant panel assembly or traveling in an angular direction relative to the ballistic resistant panel. The enhanced integrity, which will be discussed herein, provides for binding together the ballistic resistant plies of the ballistic resistant panel proximate to the location of the impacting ballistic projectile which occurs at the edge portion of the ballistic resistant panel. Binding the ballistic resistant plies together resists separation of the ballistic resistant plies at the edge portion of the of the ballistic resistant panel assembly. The bound ballistic resistant plies provide a blocked pathway of the ballistic projectile which can have a component of movement toward the peripheral edge of the ballistic resistant panel assembly. The enhanced integrity additionally provides a binding layer secured to the ballistic resistant plies which encases the peripheral edges of the ballistic resistant plies enclosing the peripheral edge of the ballistic resistant panel which further provides a blocked pathway of the ballistic projectile which has impacted the ballistic resistant panel and which has a component of movement toward the peripheral edge of the ballistic resistant panel assembly An example of a ballistic resistant panel assembly, for discussion herein, will be a front ballistic resistant panel assembly used in association with concealable body armor carrier 10, as seen in FIG. 1. Concealable body armor carrier 10, includes front garment enclosure 12 and back garment enclosure 14 wherein each enclosure 12, 14 carry a ballistic resistant panel assembly 34. Shoulder straps 16 adjustably connect front garment enclosure 12 to back garment enclosure 14. In this example, ends 18 of shoulder straps 16 are secured in this example by way of stitching or by way any other way of fixed securement. Opposing ends 20 of shoulder straps 16 are adjustably secured to front garment enclosure 12. In this example, panels of flexible loop type fasteners 22 are secured to front garment enclosure 12 and corresponding straps 16 carry at least one panel of flexible hook type fasteners 24, which when panel of flexible hook type fasteners 24 are placed onto panel of flexible loop type fasteners 22, straps 16 are releasably secured to front garment enclosure 12. This arrangement secures both straps 16 to front garment enclosure 12 and allows the wearer to adjust the positioning of front and back garment enclosures 12, 14, relative to the wearer's torso.

Concealable carrier 10 is also secured to the wearer with use of side straps 26. Side straps 26 at one end 28 are secured to back garment enclosure 14 by way of stitching or by way of other common fixed securement methods. In this example, panel of flexible loop type fasteners 30 are secured to front garment enclosure 12 and straps 26 carry at least one panel of flexible hook type fasteners 32. With all four straps 26, in this example, positioned in a desired location, flexible hook type fasteners 32 are engaged with flexible loop type fasteners 30 positioned on front garment enclosure 12 providing the wearer a snug fit to wearer's torso.

Front ballistic resistant panel assembly 34 is positioned within front garment enclosure 12 and back ballistic resistant panel assembly 36 is positioned within back garment enclosure 14. Front ballistic resistant panel assembly 34 will be used as an example of a ballistic resistant panel assembly to which to employ the enhanced integrity to a ballistic resistant panel assembly, to be discussed herein, and which can be applied to other applications of use of ballistic resistant panels including that of back ballistic resistant panel assembly 34.

Figure 3:
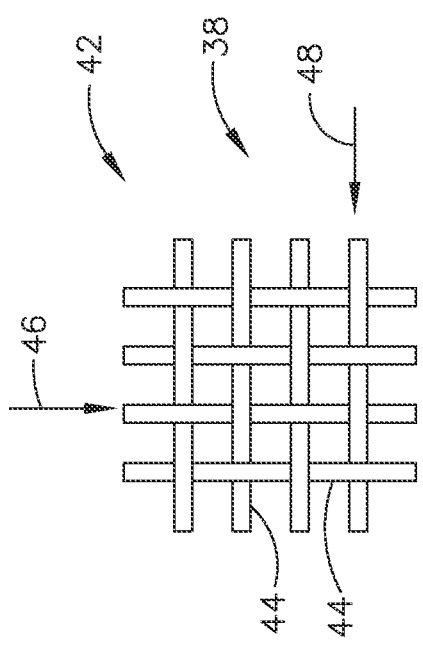
FIG. 3 is a schematic view of an example of a weave configuration for a ballistic resistant ply for a ballistic resistant panel assembly of FIG. 2.

In FIG. 2, an exploded view of ballistic resistant panel assembly 34 is schematically shown. Ballistic resistant panel assembly 34 is constructed of plurality of ballistic resistant plies 38 positioned within a stack 40. Ballistic resistant plies 38 can be made from a wide variety of different constructions. Such examples of construction include, as seen in schematic view of FIG. 3, ballistic resistant ply 38 being constructed of woven fibers 42 of high strength fibers 44 which are configured to extend in warp direction 46 and a weft direction 48 forming a fabric. Woven fibers 42 can be selected from a number of various weave constructions such as, for example, a plain weave as seen in FIG. 3, a sateen weave (not shown) and a variety of other weaves commonly employed in the construction of ballistic resistant plies 38 used for construction of ballistic resistant panel assembly 34. High strength fibers 44 are composed from a wide variety of high strength materials such as for example an aramid, an ultra-high molecular weight polyethylene (UHMWPE), or a carbon, or other compositions of high strength fibers used for ballistic resistant panel assembly construction. A wide variety of weave constructions and fiber compositions can be selected for the construction of ballistic resistant plies 38 to be used in the construction of ballistic resistant panel assembly 34. The selection of weave constructions and fiber compositions depend on the particular performance parameters that are needed for a particular ballistic resistant panel assembly 34.

Figure 4:
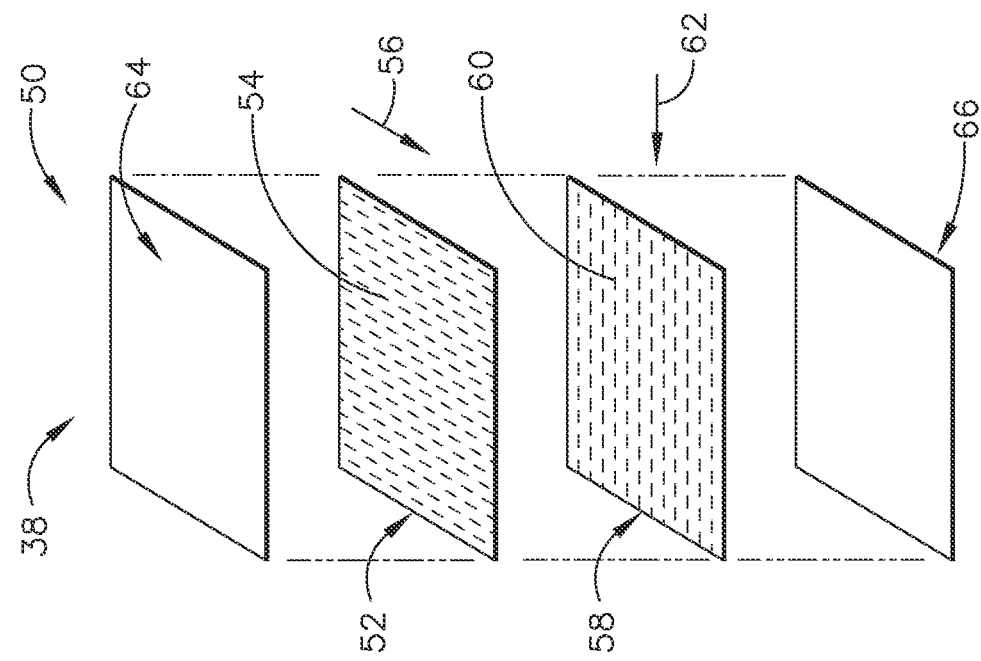
FIG. 4 is an exploded schematic view of a composite unidirectional fiber laminate for a ballistic resistant ply of FIG. 2.
Figure 4A:
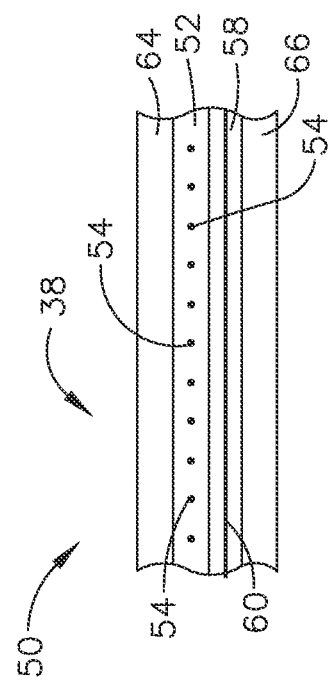
FIG. 4A is a schematic assembled view of the composite unidirectional fiber laminate for the ballistic resistant ply of FIG. 4.

Another example of a construction for ballistic resistant plies 38 used for constructing ballistic resistant panel assembly 34 includes ballistic resistant plies 38 being constructed of composite unidirectional fiber laminate 50. A schematic example of composite unidirectional fiber laminate 50 is shown in FIGS. 4 and 4A. There are numerous different constructions of composite unidirectional fiber laminates 50. In the example shown in FIG. 4, composite unidirectional fiber laminate 50 includes at least one layer 52 which has a plurality of first fibers 54 which extend in first direction 56 and at least one layer 58 which have a plurality of second fibers 60 extend in a second direction 62, wherein first and second directions 56, 62 are generally transverse to one another. Depending on the composite unidirectional fiber laminate 50 selected to be used for the construction of a particular ballistic resistant ply 38, composite unidirectional fiber laminate 50 can have various numbers of different layers within its construction wherein each layer contains a plurality of fibers extending in a single direction. Generally, adjacent layers have fibers in each layer which extend in transverse direction relative to the fibers in the other layer. First fibers 54 and second fibers 60 are selected from a wide variety of high strength fibers such as an aramid, or an ultra-high molecular weight polyethylene (UHMWPE) as well as other high strength fibers commonly used in the construction of ballistic resistant panels.

At least one layer 52 has plurality of first fibers 54 and at least one layer 58 has plurality of second fibers 60. In this schematic example, plurality of first fibers 54 are held together in at least one layer 52 with typically a very low modulus matrix often referred to as an elastic binder resin which is similar for the construction of at least one layer 58 with respect to plurality of second fibers 60. The layers containing fibers, such as, at least one layer 52 and at least one layer 58 are positioned in a sandwich arrangement between typically thin films 64, 66 which are constructed for example of a polyethylene and are laminated together securing together in this example at least one layer 52 and least one layer 58, as seen in FIG. 4A. An example of ballistic resistant plies 38 includes a composite unidirectional fiber laminate known as Dyneema® UD, a registered trademark of the Avient Corporation. A wide variety of different composite unidirectional fiber laminates can be selected to be plies 38 of ballistic resistant panel assembly 34.

A wide variety of constructions can be selected for ballistic resistant plies 38 in constructing ballistic resistant panel assembly 34 which may include woven fabrics, composite unidirectional fiber laminates, or a combination thereof, depending on the performance parameters required for a particular ballistic resistant panel assembly 34.

In referring to FIGS. 5-5B, a first example of ballistic resistant panel assembly 34 is shown which includes a plurality of ballistic resistant plies 38 positioned in stack 40, as seen in FIG. 2. In fabrication of a ballistic resistant panel assembly 34, ballistic resistant plies 38 can be positioned in stack 40 wherein ballistic resistant plies are then cut to have a same size and shape. Other fabrication processes can have ballistic resistant plies 38 cut so as to have a same size and shape and then assembled into stack 40. Typically, ballistic plies 38 of stack 40 are secured together to maintain ballistic resistant plies 38 in alignment with one another for completing the fabrication process. The securement of the ballistic resistant plies 38 can be accomplished in various ways such as using bar tacking, stitching or other commonly known ways to maintain a plurality of ballistic resistant plies 38 in alignment within stack 40. As seen in FIG. 2, ballistic resistant plies 38 have peripheral edges 69 which are generally aligned with each other and form peripheral stack edge 71 of plurality of ballistic resistant plies 38 about a perimeter 86 of ballistic resistant panel assembly 34, as seen by dashed line 71 of FIG. 5A. In addition, in this first example binding layer 68, constructed of a strong flexible material such as a nylon, an aramid, or a polyethylene such as (UHMWPE) or similarly strong flexible material is used to encase peripheral edges 69 of all of the ballistic resistant plies 38 in stack 40 as seen in FIGS. 2 and 5A, as will be discussed in more detail below.

As seen in FIG. 5A, first portion 70 of binding layer 68 extends along and overlies first ballistic resistant ply 72 of plurality of ballistic resistant plies 38 of stack 40. First ply 72, in this example, is positioned on strike side 74 of ballistic resistant plies 38 and ballistic resistant panel assembly 34. A second portion 76 of binding layer 68 extends from first portion 70 of binding layer 68 and extends along peripheral edges 69 of all of the plurality of ballistic resistant plies 38 in stack 40, as seen in the example in FIG. 5A. Second portion 76, depending on how taut the securement of binding layer 68 is made with respect to ballistic resistant panel assembly 34 and depending on the length of ballistic resistant plies 38, will determine whether second portion 76 of binding layer 68 is in contact with any peripheral edge 69 of ballistic resistant plies 38 positioned within ballistic resistant plies 38 of stack 40. Third portion 80 of binding layer 68, as seen in FIG. 5A, extends from second portion 76 and extends along last ply 84 of the plurality of ballistic resistant plies 38 of stack 40, such that the last ballistic resistant ply 84 is positioned between first ballistic resistant ply 72 and third portion 80 of binding layer 68. In this example, binding layer 68, which includes second portion 76 of binding layer 68, as seen in FIG. 5A, extends about perimeter 86 of ballistic resistant panel assembly 34, as seen in FIG. 5. Second portion 76 overlies peripheral edges 69 of all ballistic resistant plies 38 in stack 40 about perimeter 86 of ballistic resistant panel assembly 34. As a result, in this example binding layer 68 encases peripheral edges 69 of plurality of ballistic resistant plies 38 of stack 40 about perimeter 86 of ballistic resistant panel assembly 34.

Ballistic resistant panel assembly 34, further includes a plurality of stitches 90, which includes thread member 88 which will be discussed further below. Plurality of stitches 90 extend through first portion 70 of binding layer 68 and third portion 80 of binding layer 68, as well as, extend through first ballistic resistant ply 72 and last ballistic resistant ply 84 of stack 40, including, in this example as seen in FIG. 5A, through any ballistic resistant plies 38 positioned between first and last ballistic resistant plies 72, 84, such that plurality of stitches 90 form a configuration. The configuration includes rows 92 of stitches 90 which extend spaced apart 94 from one another and spaced apart from peripheral stack edge 71 of plurality of ballistic resistant plies 38 of ballistic resistant panel assembly 34, as seen in FIGS. 5-5B. The plurality of stitches 90 secure together first ballistic resistant ply 72 and last ballistic resistant ply 84 as well as, as seen in FIG. 5A, other ballistic resistant plies 38 of stack 40 positioned between first and last ballistic resistant plies 72, 84. This stitching construction further secures binding layer 68 to first and last ballistic resistant plies 72, 84 and the plurality of ballistic resistant plies 38 positioned therebetween and thereby encases peripheral edges 69 of the ballistic resistant plies 38 of stack 40, being first and last ballistic resistant plies 72, 84 and any ballistic resistant plies 38 positioned therebetween about perimeter 86, of ballistic resistant panel assembly 34, as seen in FIGS. 5-5A, encasing and overlying peripheral edges 69 of all of the ballistic resistant plies 38 in stack 40.

With binding together of all of ballistic resistant plies 38 in stack 40 with rows 92 of stitches 90 spaced apart from one another and spaced apart from peripheral stack edge 71 of plurality of ballistic resistant plies 38 of ballistic resistant panel assembly 34 and encasing peripheral edges 69 of ballistic resistant plies 38 in stack 40 with binding layer 68, such construction provides an encasement construction which provides enhanced integrity to ballistic resistant panel 34. This enhanced integrity provides resistance to separation of adjacent ballistic resistant plies 38 within stack 40 and encases the peripheral edges 69 of plurality of ballistic resistant plies 38. This construction thereby facilitates capture of a ballistic projectile within ballistic resistant panel assembly 34, which has impacted ballistic resistant panel assembly 34 proximate to peripheral stack edge 71 of the plurality of ballistic resistant plies 38 with binding together all of the plurality of ballistic resistant plies 38 within stack 40 by rows 92 of stitches 90 and with utilizing binding layer 68 secured and positioned encasing peripheral edges 69 of the ballistic resistant plies 38 in stack 40.

In fabricating ballistic resistant panel assembly 34, the manufacturer can provide a sufficient number of ballistic resistant plies 38 in stack 40 to slow down and resist penetration through ballistic resistant panel assembly 34 for a particular level of threat. Depending on the threat level being addressed by ballistic resistant panel assembly 34, two to four or more rows 92 of stitches 90 can be employed which provide sufficient binding of the ballistic resistant plies 38 in stack 40 and provide securement of binding layer 68 enclosing the peripheral edges 69 of ballistic resistant plies 38 in stack 40.

Capture of the ballistic resistant projectile within ballistic panel 34 is facilitated with the use of a strong thread member 88 used in the plurality of stitches 90 which is constructed of a strong material such as nylon, aramid, polyethylene or other comparably strong material. In this example, a nylon thread is used which is designated commercially as "Tex 70" and which is positioned in this example with eight stitches per inch. The size of the nylon or other material which constructs the stitches and the number of stitches can be varied to accommodate the strength of binding needed for confronting a particular level of threat. In addition to the strength of the thread and number of stitches employed, it is beneficial to employ a configuration of stitching which includes rows 92 of stitches 90 which extend along spaced apart from peripheral stack edge 71 of ballistic resistant panel 34, as seen in FIGS. 5A-5B, and extend spaced apart 94 from one another. In this example, rows 92 of stitches 90 extend parallel relative to one another and parallel to peripheral stack edge 71.

This example of stitching shown in this first example of ballistic resistant panel assembly 34, in FIGS. 5-5B, includes four rows 92 of stitches 90 which extend spaced apart 94 from each adjacent row 92. The number of rows 92 of stitches 90 employed depends on a threat level to be confronted by the ballistic resistant panel assembly 34. In this example, ballistic resistant panel 34 assembly is designed to confront a threat level IIIA and utilizes four rows 92 of stitches 90 which extend along spaced apart 94 from one another and spaced from peripheral edge 71 of ballistic resistant panel assembly 34. A lesser number of rows 92 may be employed for a lesser threat level to be confronted such as two rows 92 for a ballistic resistant panel assembly 34 which needs to confront a threat level IIA. The configuration of having rows 92 of stitches 90 spaced apart 94 and extending along another row 92 of stitches 90 which are proximate to peripheral stack edge 71 of ballistic resistant panel 34 assembly, provides a sufficient binding of ballistic resistant plies 38 and encasement securement of binding layer 38 so as to facilitate capture of a ballistic projectile within ballistic resistant panel 34 which has impacted ballistic resistant panel assembly 34 proximate to peripheral stack edge 71 of plurality of ballistic resistant plies 38 of ballistic resistant panel assembly 34.

It should also be understood that many different types and configurations of stitches may be used in securing ballistic resistant plies 38 and binding layer 68 together. A wide variety of stitches can be used such as straight, zigzag, chain, outline, running, satin, tack as well as many other commonly used stitches. The positioning of these types of stitches in rows 92 of stitches 90 spaced apart from one another and spaced apart from peripheral stack edge 71 of the plurality ballistic resistant plies 38 provides the needed binding of the plurality of ballistic resistant plies 38 in stack 40 and binding of binding layer 68 to the ballistic resistant plies 38 to facilitate capture of a ballistic projectile which has impacted ballistic resistant panel assembly 34 proximate to peripheral stack edge 71 of plurality of ballistic resistant plies 38 of ballistic resistant panel assembly 34.

A second example of ballistic resistant panel assembly 34 is seen in FIG. 6. The configuration of providing enhanced integrity to ballistic resistant panel 34 proximate to peripheral stack edge 71 of the plurality of ballistic resistant plies 38 of neck area 96 of ballistic resistant panel assembly 34, in FIG. 6, is similar in construction to that of the first example of ballistic resistant panel assembly 34 as seen in FIGS. 5A-5B in which the enhanced integrity is positioned about the perimeter 86 of ballistic resistant panel 34 assembly, except for the enhanced integrity in FIG. 6 is positioned localized to neck area 96. Thus, in the following description of this second example of ballistic resistant panel assembly 34 in FIG. 6, the description will also utilize that which is shown in FIGS. 5A-5B. Second portion 76 of binding layer 68, as seen in FIG. 5A-6, extends along peripheral edges 69 of ballistic resistant plies 38 of stack 40. In this second example, second portion 76 of binding layer 68 has a length 98 positioned and extending between two shoulder portions 100 of front ballistic resistant panel assembly 34, as seen in FIG. 6. In this second example, plurality of stitches 90 are stitched forming a configuration of rows 92 of stitches 90 which extend in this example spaced from and parallel to peripheral stack edge 71 of plurality of ballistic resistant plies 38 of ballistic resistant panel assembly 34 in this example and spaced 94 apart from and parallel to one another as seen in FIGS. 5A-5B, in this example. The number of rows 92 of stitches 90 employed in the second example depends on the threat level confronted is discussed earlier with respect to the first example above. In FIG. 6, each row 92 of stitches 90 includes a back stitch 102 to inhibit the row of stitches from unraveling.

Figure 7:
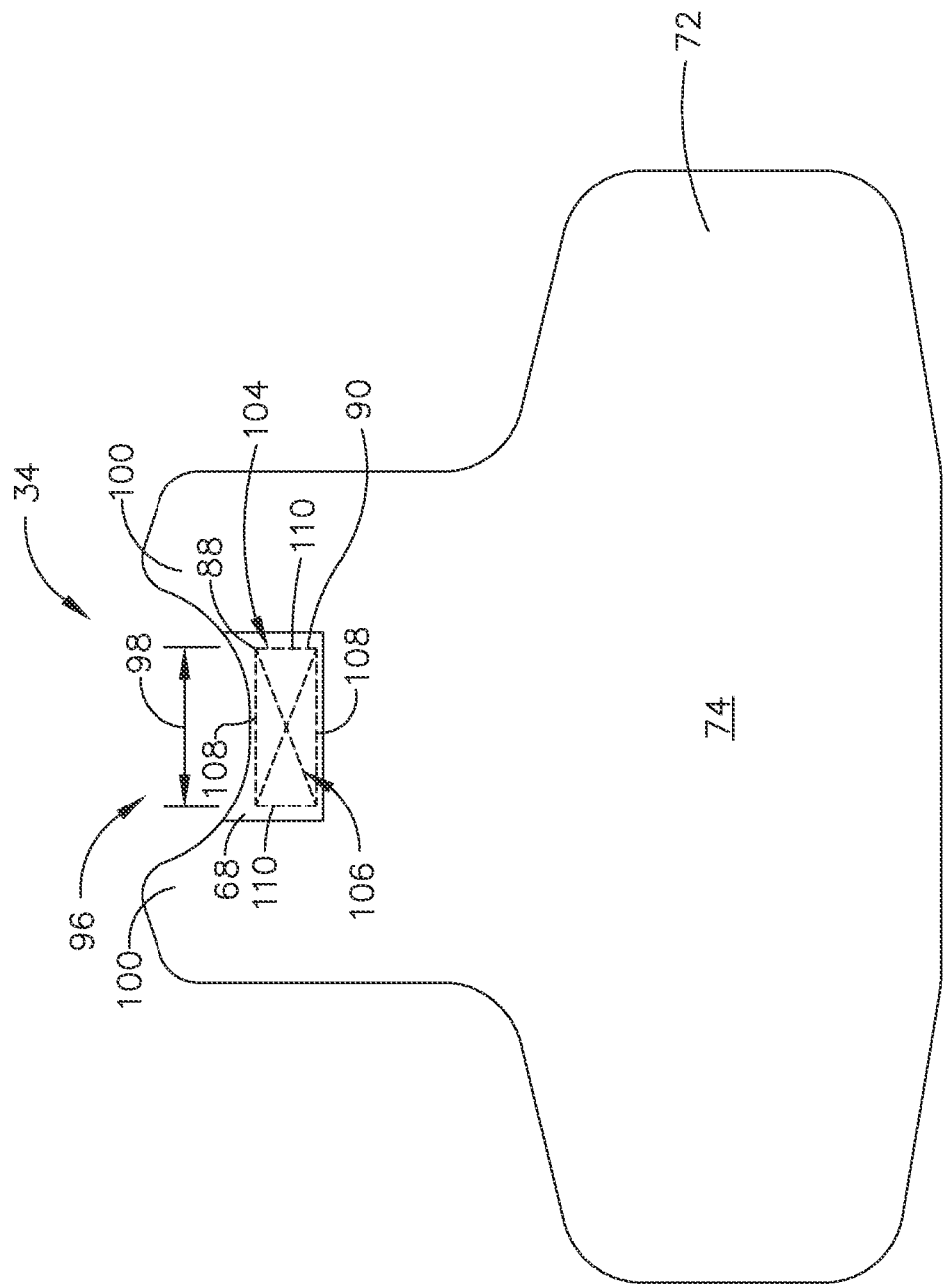
FIG. 7 is an example of use of a different stitching configuration than used in FIG. 6.

Another example of the second example, of ballistic resistant panel assembly 34 which was discussed above and shown in FIG. 6, is shown in FIG. 7. This another example is similar to the second example of FIG. 6 wherein the enhanced integrity is positioned in the neck area 96 of ballistic resistant panel assembly 34 except the stitching configuration of thread member 88 in this another example is different. Plurality of stitches 90 are stitched forming a configuration of stitches 90 of a rectangular box configuration 104 with an "x" configuration 106 positioned within the rectangular box configuration 104. The opposing rows of stitching 108 provide spaced apart rows of stitching as discussed earlier, which are spaced apart from one another and spaced apart from peripheral stack edge 71, as seen in FIG. 5A, but in addition this third example also provides opposing end rows 110 and "x" configuration 106 of stitches which extend between opposing rows of stitching 108 and provide additional integrity enhancement for this another example.

Figure 8:
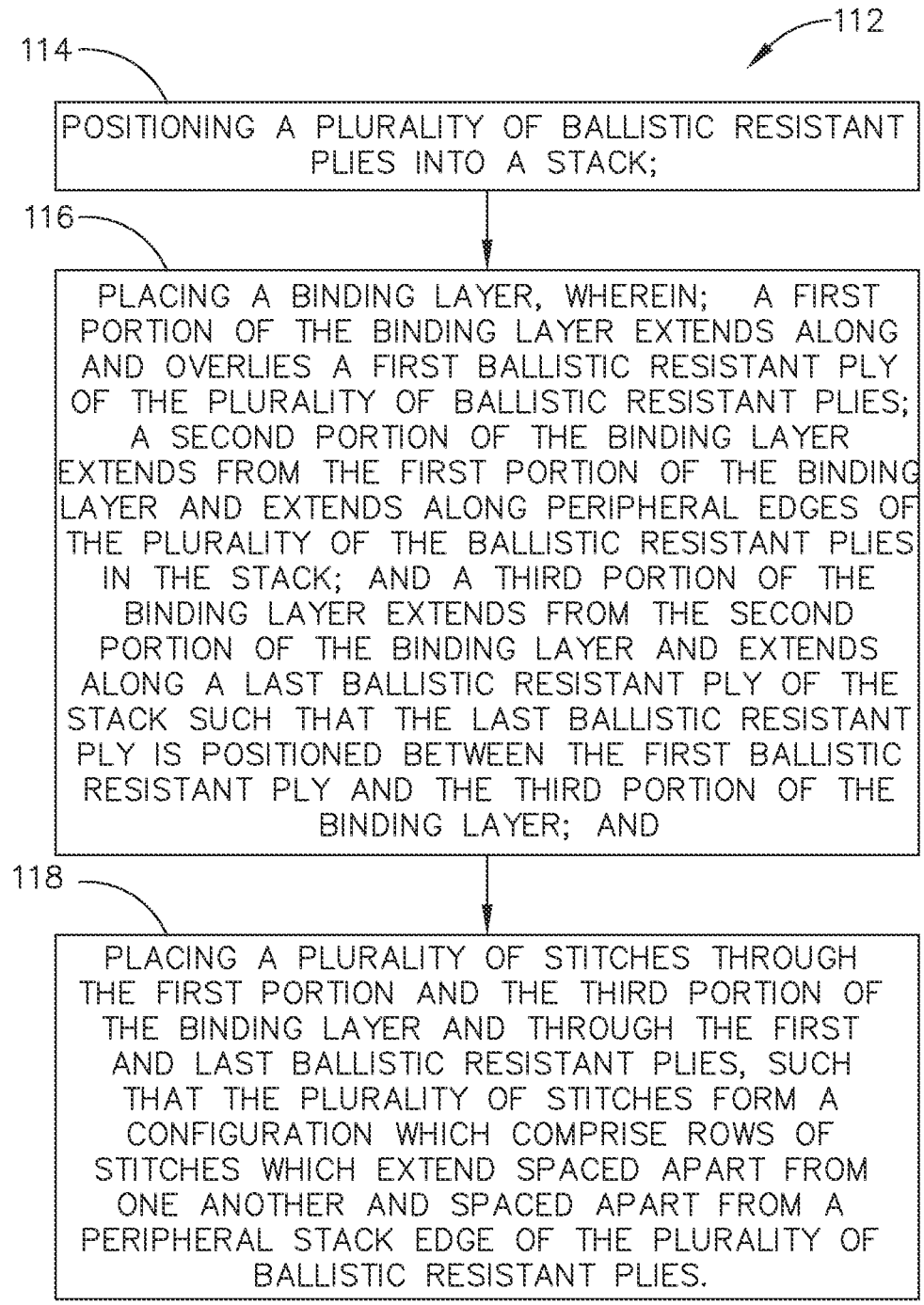
FIG. 8 is a flow chart of a first method for fabricating the ballistic resistant panel.

In referring to FIG. 8, a first method 112 for fabricating a ballistic resistant panel assembly 34 is shown. Method 112 includes positioning 114 a plurality of ballistic resistant plies 38 into a stack 40 and further includes placing 116 binding layer 68 wherein first portion 70 of binding layer 68 extends along and overlies first ballistic resistant ply 72 of the plurality of ballistic resistant plies 38 as seen in FIG. 5A. Binding layer 68 further includes second portion 76 which extends from first portion 70 of binding layer 68 and extends along peripheral edges 69 of plurality of ballistic resistant plies 38 in stack 40. Third portion 80 of binding layer 68 extends from second portion 76 of binding layer 68 and extends along last ballistic resistant ply 84 of stack 40 such that last ballistic resistant ply 84 is positioned between first ballistic resistant ply 72 and third portion 76 of binding layer 68. Method 112 further includes placing 118 a plurality of stitches 90 through first portion and third portions 70, 80 of binding layer 68 and through first ballistic resistant ply 72 and last ballistic resistant ply 84 such that plurality of stitches 90 form a configuration which includes rows 92 of stitches 90 which extend spaced apart from one another and spaced apart from peripheral stack edge 71. This stitching configuration in this example secures all of the plurality of ballistic resistant plies 38 together in stack 40 and secures binding layer 68 to the plurality of ballistic resistant plies 38 of stack 40. Binding layer 68 encases peripheral edges 69 of ballistic resistant plies 38 which includes first ballistic resistant ply 72, last ballistic resistant ply 84 and ballistic resistant plies positioned therebetween, in this example.

As discussed earlier, at least one ply of plurality of ballistic resistant plies 38 is constructed of a fabric constructed from woven fibers 42 composed of high strength fibers 44, as shown in FIG. 3, or at least one ply of plurality of ballistic resistant plies 38 is constructed of composite unidirectional fiber laminate 50 as seen in FIGS. 4-4A.

Placing 116 binding layer 68, in the first example of ballistic resistant panel assembly 34, includes positioning second portion 76 of binding layer 68 about perimeter 86, as seen in FIG. 5, of ballistic resistant panel assembly 34 overlying peripheral edges 69, in this example, of all of the ballistic resistant plies 38 in stack 40. Method 112 further includes placing 118 plurality of stitches 90 to form a configuration of rows 92 of stitches 90 which extend parallel to peripheral stack edge 71 of ballistic resistant plies 38 and parallel to one another in the example as seen in FIGS. 5A and 5B.

In the second example of ballistic resistant panel assembly 34 discussed earlier and seen in FIG. 6, second portion 76 of binding layer 68 extends along peripheral edges 69, in this example of all of the plurality of ballistic resistant plies 38 in stack 40 with second portion 76 having a length 98 positioned and extending between two shoulder portions 100 of a front ballistic resistant panel assembly 34. Placing 118 plurality of stitches 90 for this second example can take on various stitching configurations. Placing 118 plurality of stitches 90, as similar to what is shown in FIGS. 5A-5B, include having stitches 90 forming a configuration of rows 92 of stitches 90 which extend parallel to peripheral stack edge 71 of the plurality of ballistic resistant plies 38 and extend parallel to one another, as seen for example in FIGS. 5B-6. In this example, each row 92 of stitches 90, as seen in FIG. 6, includes back stitch 102, as schematically indicated in FIG. 6, which inhibits each row 92 of stitches 90 from unraveling. Another example of a configuration for placing 118 plurality of stitches 90, is seen as the second example of ballistic resistant panel 34 in FIG. 7, includes placing 118 plurality of stitches 90 to form a configuration which includes rectangular box configuration 104 with an "x" configuration 106 positioned within rectangular box configuration 104, as mentioned earlier.

Figure 9:
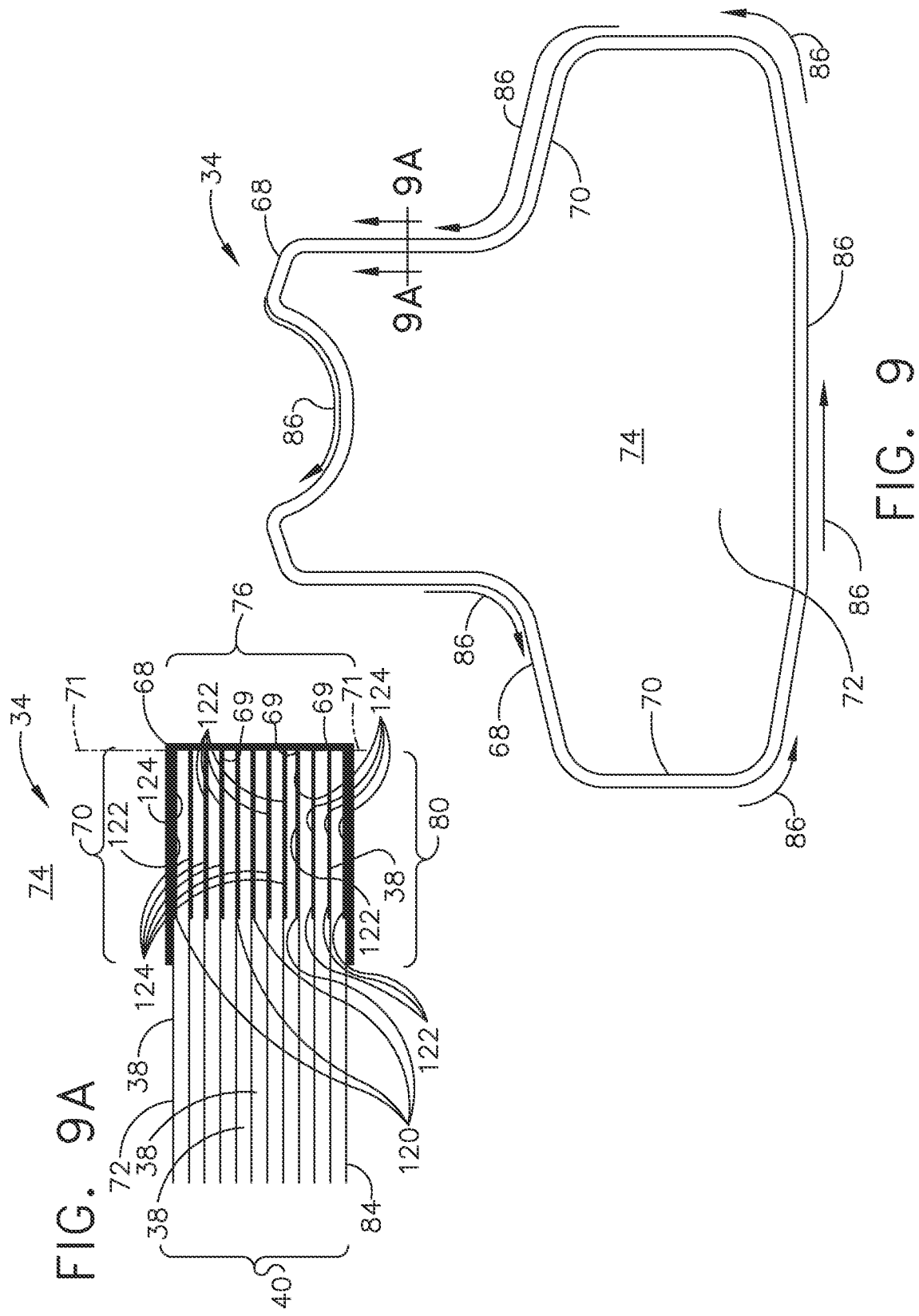
FIG. 9 is a plan view of a third example of the plurality of ballistic plies assembled of FIG. 2, which schematically represents a first version of the third example and schematically represents a second version of the third example, with the perimeter edge of the ballistic resistant panel assembly encased.
Figure 10:
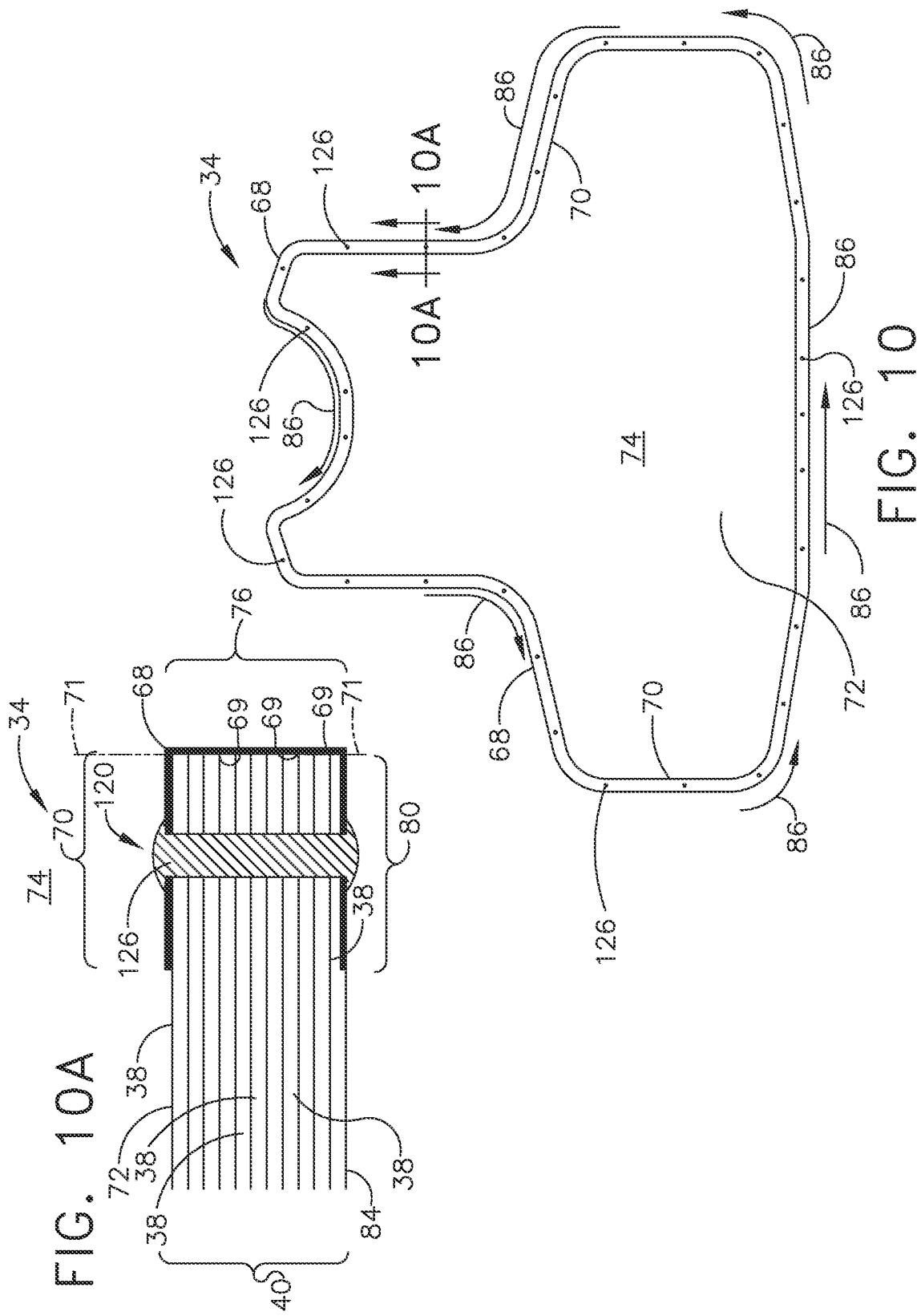
FIG. 10 is a plan view of a third version of the third example of the plurality of ballistic resistant plies assembled of FIG. 2 with the perimeter edge of the ballistic resistant panel encased.

With respect to a third example of ballistic resistant panel assembly 34, three versions of the third example, can be seen in FIGS. 9-10A. All three versions of the third example of ballistic resistant panel assembly 34 has similar construction as described above with respect to the first example of ballistic resistant panel assembly 34 shown in FIGS. 5 and 5A. However, unlike the first example, the three versions of the third example do not employ a plurality of stitches 90 which extend through first portion 70 and third portion 80 of binding layer 68 and through first ballistic resistant ply 72 and last ballistic resistant ply 84 of ballistic resistant plies 38 of stack 40, as seen in FIGS. 5 and 5B. Instead, the third example includes securement mechanism 120, which has two versions which are shown schematically in FIG. 9A and a third version shown in FIG. 10A, which is utilized for binding together first portion 70 of binding layer 68 to first ballistic resistant ply 72 and third portion 80 of binding layer 68 to last ballistic resistant ply 84. The identification numbers within FIGS. 9, 9A, 10, and 10A, of the three versions of this third example of ballistic resistant panel assembly 34, which are the same as seen in the first example of ballistic resistant panel assembly 34 in FIGS. 5 and 5A are the same parts as identified and described earlier with respect to the first example shown in FIGS. 5 and 5A and are herein incorporated for the three versions of the third example of the ballistic resistant panel assembly 34 as seen in FIGS. 9, 9A, 10, and 10A.

In a first version of the third example, securement mechanism 120 includes adhesive layer 122 positioned between first portion 70 of binding layer 68 and first ballistic resistant ply 72 and positioned between third portion 80 of binding layer 68 and last ballistic resistant ply 84, as seen in FIG. 9A. Additionally, in this example, adhesive layer 122 is positioned between adjacent ballistic resistant plies 38 positioned between first ballistic resistant ply 72 and last ballistic resistant ply 84. Adhesive layer 122 extends, in this example, from proximate to peripheral edge 69 of ballistic resistant plies 38 and away from peripheral edge 69 of ballistic resistant plies 38. Adhesive material for adhesive layer 122 can be selected from a variety of adhesive materials such as an epoxy or an urethane based adhesive or other known adhesive materials for binding ballistic resistant plies 38 to a binding layer 68 and for binding together ballistic resistant plies 38 to one another.

Second version of the third example of ballistic resistant panel assembly panel 34 can also be seen schematically in FIGS. 9-9A. This second version of the third example of ballistic resistant panel assembly 34 is similarly constructed as described above with respect to the first example of FIGS. 5-5A, however, this second version of the third example, as mentioned above with respect to the first version of the third example, does not utilize a plurality of stitches 90 which extend through first portion 70 and third portion 80 of binding layer 68 and through first ballistic resistant ply 72 and last ballistic resistant ply 84, as seen in FIGS. 5 and 5B. Instead, second version of the third example includes securement mechanism 120, as seen in FIG. 9A, which is utilized for binding together first portion 70 of binding layer 68 to first ballistic resistant ply 72 and third portion 80 of binding layer 68 to last ballistic resistant ply 84. The identification numbers within FIGS. 9 and 9A of this second version of the third example of ballistic resistant panel assembly 34 which are the same as seen in FIGS. 5 and 5A are the same parts as identified and described earlier with respect to FIGS. 5 and 5A and are herein incorporated for FIGS. 9 and 9A.

In the second version of the third example, securement mechanism 120 includes compression heated molded layer 124, which occupies the similar schematic position of previously identified adhesive layer 122, positioned between first portion 70 of binding layer 68 and first ballistic resistant ply 72 and positioned between third portion 80 of binding layer 68 and last ballistic resistant ply 84. Additionally, in this example compression heated molded layer 124 is positioned between adjacent ballistic resistant plies 38 positioned between first ballistic resistant ply 72 and last ballistic resistant ply 84. Compression heated molded layer 124 extends in this example from proximate to peripheral edge 69 of ballistic resistant plies 38 and away from peripheral edge 69 of ballistic resistant plies 38. Compression heated molded layer 124 can be selected from various materials such as a polyurethane film and other known materials utilized to form a compression heated molded layer which binds ballistic resistant plies 38 to a binding layer 68 and for binding together ballistic resistant plies 38 to one another.

Third version of the third example of ballistic resistant panel assembly panel 34 can be seen in FIGS. 10-10A. This third version of the third example of ballistic resistant panel assembly 34 is similarly constructed as described above with respect to the first example of FIGS. 5-5A, however, this third version of the third example, as mentioned above with respect to the first and second versions of the third example, does not utilize a plurality of stitches 90 which extend through first portion 70 and third portion 80 of binding layer 68 and through first ballistic resistant ply 72 and last ballistic resistant ply 84 of all of ballistic resistant plies 38 of stack 40, as seen in FIGS. 5 and 5B. Instead, third version of the third example includes securement mechanism 120, as seen in FIGS. 10 and 10A, which is utilized for binding together first portion 70 of binding layer 68 to first ballistic resistant ply 72 and third portion 80 of binding layer 68 to last ballistic resistant ply 84. The identification numbers within FIGS. 10 and 10A of this third version of the third example of ballistic resistant panel assembly 34 which are the same as seen in FIGS. 5 and 5A are the same parts as identified and described earlier with respect to FIGS. 5 and 5A and are herein incorporated for FIGS. 10 and 10A.

In the third version of the third example, securement mechanism 120 includes plurality of rivets 126, which extend through first portion 70 of binding layer 68, first ballistic resistant ply 72, last ballistic resistant ply 84, and third portion 80 of binding layer 68 binding these items together. Additionally, in this example plurality of rivets 126 extends through a plurality of ballistic resistant plies 38 positioned between first ballistic resistant ply 72 and last ballistic resistant ply 84 binding them together, binding layer 68 and ballistic resistant plies positioned between the first portion 70 and the third portion 80 of the binding layer 68. The plurality of rivets are positioned proximate to peripheral edges 69 of the ballistic resistant plies 38. The plurality of rivets 126 are also positioned spaced apart about a peripheral edge portion of ballistic resistant panel assembly 34 as seen in FIG. 10. Plurality of rivets 126 can be selected from known rivets utilized in clothing fabrication.

It can be appreciated that anyone of the above-described securement mechanism 120 including adhesive layer 122, compression heated molded layer 124 or plurality of rivets 126 can be applied in the neck area 96 between shoulder portions 100 of front ballistic resistant panel assembly, as seen in FIGS. 6 and 7 in place of plurality of stitches 90. Securement mechanism 120 can be employed to bind together first portion 70 of binding layer 68, first ballistic resistant ply 72 (as seen in FIG. 5A), last ballistic resistant ply 84 (as seen in FIG. 5A) and third portion 80 of binding layer 68, as well as, bind together with any ballistic resistant plies 38 that may be positioned between first and last ballistic resistant plies 72, 84.

Figure 11:
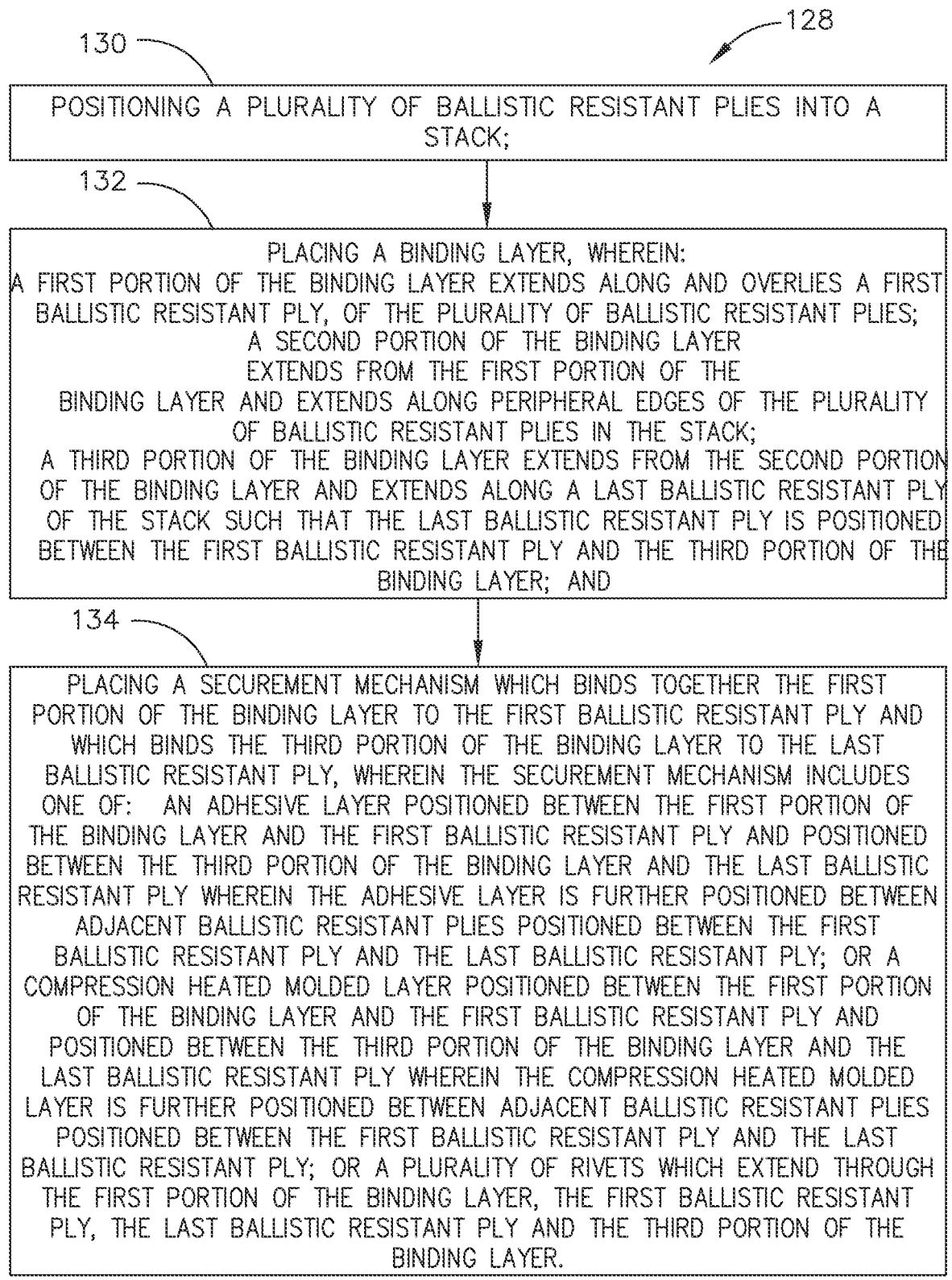
FIG. 11 is a flow chart of a second method for fabricating the ballistic resistant panel assembly.

Second method 128 for fabricating a ballistic resistant panel assembly 34 can be seen in FIG. 11. Second method 128 includes positioning 130 a plurality of ballistic resistant plies 38 into stack 40. In addition, second method 128 includes placing a binding layer 68, wherein: a first portion 70 of binding layer 68 extends along and overlies first ballistic resistant ply 72, of the plurality of ballistic resistant plies 38; a second portion 76 of binding layer 68 extends from first portion 70 of binding layer 68 and extends along peripheral edges 69 of the plurality of ballistic resistant plies 38 in stack 40; and a third portion 80 of binding layer 68 extends from the second portion 76 of the binding layer 68 and extends along last ballistic resistant ply 84 of stack 40, such that the last ballistic resistant ply 84 is positioned between the first ballistic resistant ply 72 and the third portion 80 of the binding layer 68. Second method 128 further includes placing securement mechanism 120 which binds together first portion 70 of the binding layer 68 to the first ballistic resistant ply 72 and which binds the third portion 80 of binding layer 68 to last ballistic resistant ply 84.

The second method 128 includes fabricating of a first version of a third example of ballistic resistant panel assembly 34 wherein securement mechanism 120 includes an adhesive layer 122 positioned between first portion 70 of binding layer 68 and first ballistic resistant ply 72 and positioned between third portion 80 of binding layer 68 and last ballistic resistant ply 84. In the example shown in FIG. 9A, adhesive layer 122 is also positioned between adjacent ballistic resistant plies 38 positioned between first ballistic resistant ply 72 and last ballistic resistant ply 84.

The second method 128 includes fabricating of a second version of a third example of ballistic resistant panel assembly 34 wherein securement mechanism 120 includes a compression heated molded layer 124 positioned between first portion 70 of binding layer 68 and first ballistic resistant ply 72 and positioned between third portion 80 of binding layer 68 and last ballistic resistant ply 84 as also seen in FIG. 9A. In the example shown in FIG. 9A compression heated molded layer 124 is positioned between adjacent ballistic resistant plies 38 positioned between first ballistic resistant ply 72 and last ballistic resistant ply 84.

The second method 128 includes fabricating of a third version of a third example of ballistic resistant panel assembly 34 wherein securement mechanism 120 includes a plurality of rivets 126 which extend through first portion 70 of binding layer 68, first ballistic resistant ply 72, last ballistic resistant ply 84 and third portion 80 of binding layer 68 binding these items together. Additionally, in this example plurality of rivets 126 extend through a plurality of ballistic resistant plies 38 positioned between first ballistic resistant ply 72 and last ballistic resistant ply 84 binding them together, and binding together binding layer 68 and ballistic resistant plies positioned between the first portion 70 and the third portion 80 of the binding layer 68, as seen in FIG. 10A

While various embodiments have been described above, this disclosure is not intended to be limited thereto. Variations can be made to the disclosed embodiments that are still within the scope of the appended claims.

What is claimed:

1. A ballistic resistant panel assembly, comprising:
   a plurality of ballistic resistant plies positioned in a stack;
   a binding layer, wherein:
   a first portion of the binding layer extends along and overlies a first ballistic resistant ply of the stack;
   a second portion of the binding layer extends from the first portion of the binding layer and extends along peripheral edges of the plurality of the ballistic resistant plies in the stack, wherein the second portion has a length positioned and extending only between shoulder portions of a front ballistic resistant panel assembly; and
   a third portion of the binding layer extends from the second portion of the binding layer and extends along a last ballistic resistant ply of the stack such that the last ballistic resistant ply is positioned between the first ballistic resistant ply and the third portion of the binding layer; and a plurality of stitches extend through the first portion and the third portion of the binding layer and through the first and last ballistic resistant plies, such that the plurality of stitches form a configuration which comprises rows of stitches which extend spaced apart from one another and spaced apart from a peripheral stack edge of the plurality of ballistic resistant plies.

2. The ballistic resistant panel assembly of claim 1, wherein at least one ballistic resistant ply of the plurality of ballistic resistant plies comprises woven fibers.

3. The ballistic resistant panel assembly of claim 2, wherein the woven fibers comprise one of an aramid or ultra-high molecular weight polyethylene.

4. The ballistic resistant panel assembly of claim 1, wherein at least one ballistic resistant ply of the plurality of ballistic resistant plies comprises a composite unidirectional fiber laminate.

5. The ballistic resistant panel assembly of claim 4, wherein:
the composite unidirectional fiber laminate includes at least one layer of a plurality of first fibers which extend in a first direction and at least one layer which includes a plurality of second fibers which extend in a second direction; and
the first direction is transverse to the second direction.

6. The ballistic resistant panel assembly of claim 5, wherein the at least one layer of the plurality of the first fibers which extend in the first direction and the at least one layer of the plurality of second fibers which extend in the second direction comprise one of an aramid or an ultra-high molecular weight polyethylene.

7. The ballistic resistant panel assembly of claim 1, wherein the binding layer comprises a composition of one of nylon, aramid, or polyethylene.

8. The ballistic resistant panel assembly of claim 1, wherein a thread member of the plurality of stitches comprises a composition of nylon, aramid, or polyethylene.

9. The ballistic resistant panel assembly of claim 1, wherein the rows of stitches extend parallel relative to one another, and parallel to the peripheral stack edge.

10. The ballistic resistant panel assembly of claim 1, wherein each row of stitches includes a back stitch.

11. The ballistic resistant panel assembly of claim 1, wherein the plurality of stitches form a configuration of stitches of a rectangular box configuration with an "x" configuration positioned within the rectangular box configuration.

12. A method for fabricating a ballistic resistant panel assembly, comprising:
positioning a plurality of ballistic resistant plies into a stack;
placing a binding layer, wherein:
a first portion of the binding layer extends along and overlies a first ballistic ply of the of the plurality of ballistic resistant plies;
a second portion of the binding layer extends from the first portion of the binding layer and extends along peripheral edges of the plurality of the ballistic resistant plies in the stack, wherein the second portion has a length positioned and extending only between shoulder portions of a front ballistic resistant panel assembly; and
a third portion of the binding layer extends from the second portion of the binding layer and extends along a last ballistic resistant ply of the stack such that the last ballistic resistant ply is positioned between the first ballistic resistant ply and the third portion of the binding layer; and placing a plurality of stitches through the first portion and the third portion of the binding layer and through the first and last ballistic resistant plies, such that the plurality of stitches form a configuration which comprise rows of stitches which extend spaced apart from one another and spaced apart from a peripheral stack edge of the plurality of ballistic resistant plies.

13. The method of claim 12, wherein at least one ply of the plurality of ballistic plies comprises a fabric constructed from woven fibers composed of high strength fibers.

14. The method of claim 12, wherein at least one ply of the plurality of ballistic resistant plies comprises a composite unidirectional fiber laminate.

15. The method of claim 12, wherein:
placing the plurality of stitches to form a configuration of rows of stitches which extend and parallel to one another.

16. The method of claim 15, wherein placing the plurality of stitches forms one of:
each row of stitches has a back stitch; or
a configuration of stitches which includes a rectangular box configuration with an "x" configuration positioned within the rectangular box configuration.

17. A ballistic resistant panel assembly, comprising:
a plurality of ballistic resistant plies positioned in a stack;
a binding layer, wherein:
a first portion of the binding layer extends along and overlying a first ballistic resistant ply of the stack;
a second portion of the binding layer extends from the first portion of the binding layer and extends along peripheral edges of the ballistic resistant plies in the stack; and
a third portion of the binding layer extends from the second portion of the binding layer and extends along a last ballistic resistant ply of the stack, such that the last ballistic resistant ply is positioned between the first ballistic resistant ply and the third portion of the binding layer; and
a securement mechanism which binds together the first portion of the binding layer to the first ballistic resistant ply and the third portion of the binding layer to the last ballistic resistant ply, wherein the securement mechanism comprises one of:
an adhesive layer positioned between the first portion of the binding layer and the first ballistic resistant ply and positioned between the third portion of the binding layer and the last ballistic resistant ply wherein the adhesive layer is further positioned between adjacent ballistic resistant plies positioned between the first ballistic resistant ply and the last ballistic resistant ply; or
a compression heated molded layer positioned between the first portion of the binding layer and the first ballistic resistant ply and positioned between the third portion of the binding layer and the last ballistic resistant ply wherein the compression heated molded layer is further positioned between adjacent ballistic resistant plies positioned between the first ballistic resistant ply and the last ballistic resistant ply; or
a plurality of rivets which extend through the first portion of the binding layer, the first ballistic resistant ply, the last ballistic resistant ply and the third portion of the binding layer, wherein the plurality of rivets further include extending the rivets through a plurality of ballistic resistant plies positioned between the first ballistic resistant ply and the last ballistic ply.

18. A method for fabricating a ballistic resistant panel assembly, comprising the steps of:

positioning a plurality of ballistic resistant plies into a stack;
placing a binding layer, wherein:
a first portion of the binding layer extends along and overlies a first ballistic resistant ply, of the plurality of ballistic resistant plies;
a second portion of the binding layer extends from the first portion of the binding layer and extends along peripheral edges of the ballistic resistant plies in the stack; and
a third portion of the binding layer extends from the second portion of the binding layer and extends along a last ballistic resistant ply of the stack, such that the last ballistic resistant ply is positioned between the first ballistic resistant ply and the third portion of the binding layer; and
placing a securement mechanism which binds together the first portion of the binding layer to the first ballistic resistant ply and which binds the third portion of the binding layer to the last ballistic resistant ply, wherein the securement mechanism comprises one of:
an adhesive layer positioned between the first portion of the binding layer and the first ballistic resistant ply and positioned between the third portion of the binding layer and the last ballistic resistant ply wherein the adhesive layer is further positioned between adjacent ballistic resistant plies positioned between the first ballistic resistant ply and the last ballistic resistant ply; or
a compression heated molded layer positioned between the first portion of the binding layer and the first ballistic resistant ply and positioned between the third portion of the binding layer and the last ballistic resistant ply wherein the compression heated molded layer is further positioned between adjacent ballistic resistant plies positioned between the first ballistic resistant ply and the last ballistic resistant ply; or
a plurality of rivets which extend through the first portion of the binding layer, the first ballistic resistant ply, the last ballistic resistant ply and the third portion of the binding layer, wherein the plurality of rivets further include extending the rivets through a plurality of ballistic resistant plies positioned between the first ballistic resistant ply and the last ballistic ply.

19. A ballistic resistant panel assembly, comprising:
a plurality of ballistic resistant plies positioned in a stack; and
a binding layer, wherein:
a first portion of the binding layer extends along and overlies a first ballistic resistant ply of the stack;
a second portion of the binding layer extends from the first portion of the binding layer and extends along peripheral edges of the plurality of the ballistic resistant plies in the stack, wherein the second portion has a length positioned and extending only between shoulder portions of a front ballistic resistant panel assembly; and
a third portion of the binding layer extends from the second portion of the binding layer and extends along a last ballistic resistant ply of the stack such that the last ballistic resistant ply is positioned between the first ballistic resistant ply and the third portion of the binding layer.

20. The ballistic resistant panel assembly of claim 19, further includes a plurality of stitches which extend through the first portion and the third portion of the binding layer and through the first and last ballistic resistant plies.

21. The ballistic resistant panel assembly of claim 20, wherein the plurality of stitches form a configuration which comprises rows of stitches which extend spaced apart from one another and spaced apart from a peripheral stack edge of the plurality of ballistic resistant plies.

22. A method for fabricating a ballistic resistant panel assembly, comprising:
positioning a plurality of ballistic resistant plies into a stack; and
placing a binding layer, wherein:
a first portion of the binding layer extends along and overlies a first ballistic ply of the of the plurality of ballistic resistant plies;
a second portion of the binding layer extends from the first portion of the binding layer and extends along peripheral edges of the plurality of the ballistic resistant plies in the stack, wherein the second portion has a length positioned and extending only between shoulder portions of a front ballistic resistant panel assembly; and
a third portion of the binding layer extends from the second portion of the binding layer and extends along a last ballistic resistant ply of the stack such that the last ballistic resistant ply is positioned between the first ballistic resistant ply and the third portion of the binding layer.

23. The method of claim 22 further includes placing a plurality of stitches through the first portion and the third portion of the binding layer and through the first and last ballistic resistant plies, such that the plurality of stitches form a configuration which comprise rows of stitches.

24. The method of claim 23 wherein the rows of stitches extend spaced apart from one another and spaced apart from a peripheral stack edge of the plurality of ballistic resistant plies.

* * * * *